US010493941B2

(12) United States Patent
Szawarski et al.

(10) Patent No.: US 10,493,941 B2
(45) Date of Patent: Dec. 3, 2019

(54) DOOR MOUNTED AIRBAG ASSEMBLY WITH CONCAVE SURFACE

(71) Applicant: Ford Global Technologies, LLC, Dearborn, MI (US)

(72) Inventors: Hubert Szawarski, Waterford, MI (US); Manoharprasad K. Rao, Novi, MI (US); Mark A. Cuddihy, New Boston, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 122 days.

(21) Appl. No.: 15/379,134

(22) Filed: Dec. 14, 2016

(65) Prior Publication Data

US 2018/0162310 A1    Jun. 14, 2018

(51) Int. Cl.
| | |
|---|---|
| *B60R 21/21* | (2011.01) |
| *B60R 21/2342* | (2011.01) |
| *B60R 21/237* | (2006.01) |
| *B60R 21/2334* | (2011.01) |
| *B60R 21/231* | (2011.01) |
| *B60R 21/2338* | (2011.01) |
| *B60R 21/00* | (2006.01) |
| *B60R 21/235* | (2006.01) |
| *B60R 21/01* | (2006.01) |

(52) U.S. Cl.
CPC ............ *B60R 21/21* (2013.01); *B60R 21/231* (2013.01); *B60R 21/237* (2013.01); *B60R 21/2334* (2013.01); *B60R 21/2338* (2013.01); *B60R 21/2342* (2013.01); *B60R 2021/0004* (2013.01); *B60R 2021/0044* (2013.01); *B60R 2021/0048* (2013.01); *B60R 2021/01225* (2013.01); *B60R 2021/23382* (2013.01); *B60R 2021/23538* (2013.01)

(58) Field of Classification Search
CPC ... B60R 21/21; B60R 21/2342; B60R 21/231; B60R 21/237; B60R 21/2334; B60R 2021/01225; B60R 2021/0048; B60R 2021/23538; B60R 2021/0004; B60R 2021/0044
USPC ....................................... 280/730.2
See application file for complete search history.

(56) References Cited

U.S. PATENT DOCUMENTS 3,830,519 A * 8/1974 Lewis ..................... B60R 21/18
                                                     138/123
3,841,654 A * 10/1974 Lewis ..................... B60R 21/18
                                                     280/733

(Continued)

FOREIGN PATENT DOCUMENTS

| EP | 1407943 A2 | 4/2004 |
| FR | 2824029 A1 | 10/2002 |

(Continued)

OTHER PUBLICATIONS

Search Report from United Kingdom Intellectual Property Office dated May 31, 2018 regarding Application No. GB1720240.9 (5 pages).

*Primary Examiner* — Keith J Frisby
(74) *Attorney, Agent, or Firm* — Frank A. MacKenzie; Bejin Bieneman PLC

(57) ABSTRACT

An airbag includes folds with each fold having an apex and limbs. The limbs extend from the apex to the limbs of an adjacent fold. A fastener is fixed to the folds and releasably connects the folds to each other.

16 Claims, 10 Drawing Sheets

(56) References Cited

U.S. PATENT DOCUMENTS

| | | | | |
|---|---|---|---|---|
| 3,866,940 | A * | 2/1975 | Lewis | B60R 21/18 |
| | | | | 280/733 |
| 5,312,131 | A * | 5/1994 | Kitagawa | B60R 21/206 |
| | | | | 280/728.1 |
| 5,564,734 | A | 10/1996 | Stuckle | |
| 5,575,497 | A | 11/1996 | Suyama et al. | |
| 5,979,937 | A * | 11/1999 | Yoshida | B60R 21/2338 |
| | | | | 280/739 |
| 6,352,283 | B1 | 3/2002 | Ellerbroke et al. | |
| 7,484,755 | B2 * | 2/2009 | Kokeguchi | B60R 21/18 |
| | | | | 280/733 |
| 7,581,755 | B2 * | 9/2009 | Nagai | B60R 21/2342 |
| | | | | 280/743.1 |
| 8,491,006 | B2 * | 7/2013 | Nagai | B60R 21/205 |
| | | | | 280/739 |
| 2007/0152435 | A1 * | 7/2007 | Jamison | B60R 21/233 |
| | | | | 280/743.2 |
| 2012/0292897 | A1 * | 11/2012 | Puzzonia | B60R 21/233 |
| | | | | 280/741 |

FOREIGN PATENT DOCUMENTS

| | | | |
|---|---|---|---|
| GB | 2343420 A | | 5/2000 |
| JP | H4110252 A | | 4/1992 |
| JP | H07267031 A | | 10/1995 |
| KR | 2004-687361 A | * | 6/2004 |
| WO | WO 9813234 A1 | | 4/1998 |
| WO | WO 2015172868 A1 | | 11/2015 |

* cited by examiner

US 10,493,941 B2

1

DOOR MOUNTED AIRBAG ASSEMBLY WITH CONCAVE SURFACE

BACKGROUND

Vehicles, such as automobiles, may include airbags designed to inflate and be impacted by occupants of a front seat during a frontal impact of the vehicle. The airbag may be mounted to a door of the vehicle. For example, a driver airbag may be mounted to a driver door and a passenger airbag may be mounted to a passenger door. The driver airbag may be impacted by an occupant in a driver seat and the passenger airbag may be impacted by an occupant in a passenger seat during the frontal impact of the vehicle.

During the frontal impact, the vehicle may be impacted by another object across the full width of a front of the vehicle. This type of impact may cause an occupant to move directly forward in the vehicle, i.e., in a vehicle-forward direction. During an oblique impact of the vehicle, the vehicle may be impacted by another object offset from a longitudinal centerline of the vehicle. This type of impact may cause an occupant to move in the vehicle-forward direction and a cross-vehicle direction, i.e., forwardly and toward the impacted corner of the vehicle. In this instance, the occupant may impact an airbag, e.g., the driver airbag and the passenger airbag, at an angle. Similarly, during a side impact of the vehicle, an occupant may impact the airbag, e.g., the driver airbag and the passenger airbag, as the occupant is urged in the cross-vehicle direction.

DETAILED DESCRIPTION

Figure 1:
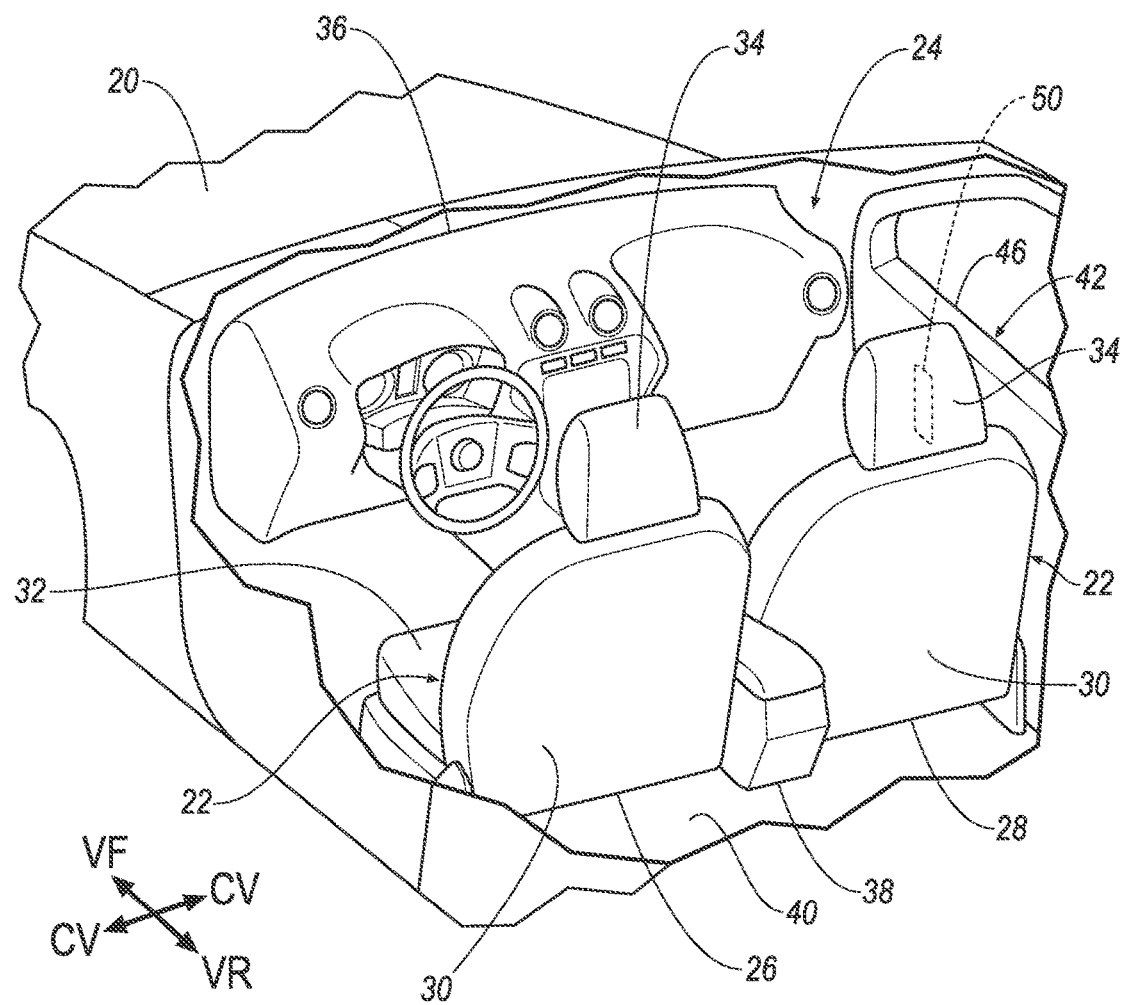
FIG. 1 is a perspective view of a vehicle including a seat, a center console, an instrument panel, and an airbag mounted to a door in an uninflated position.

With reference to the Figures, wherein like numerals indicate like parts throughout the several views, an airbag 10

2 includes folds 12. Each fold 12 has an apex 14 and limbs 16. Each limb 16 extends from the apex 14 to one of the limbs 16 of an adjacent one of the folds 12. A fastener 18 is fixed to the folds 12 and releasably connects the folds 12 to each other.

Figure 2:
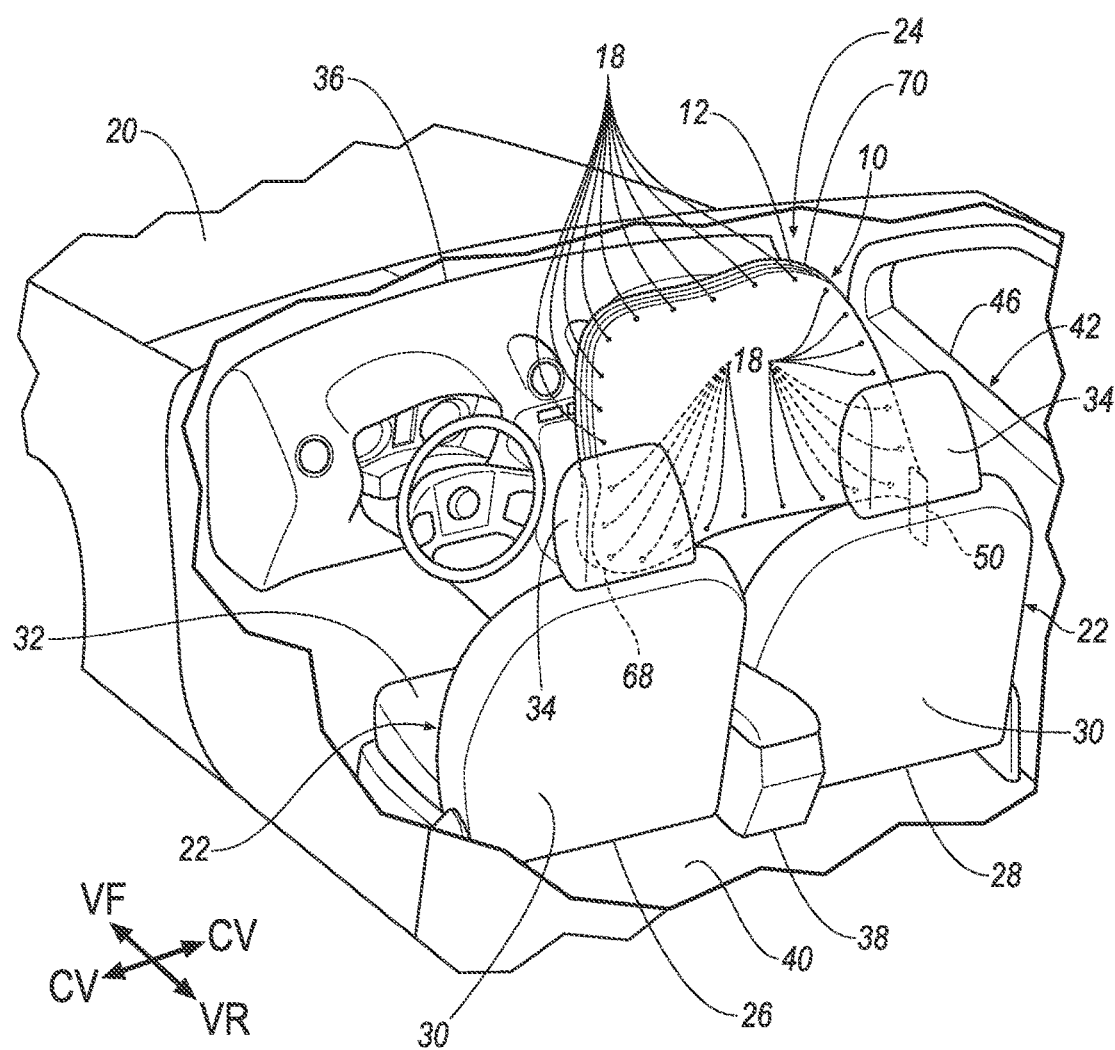
FIG. 2 is the perspective view of FIG. 1 with the airbag inflated from the door in a cross-vehicle direction in a first stage of inflation.
Figure 3:
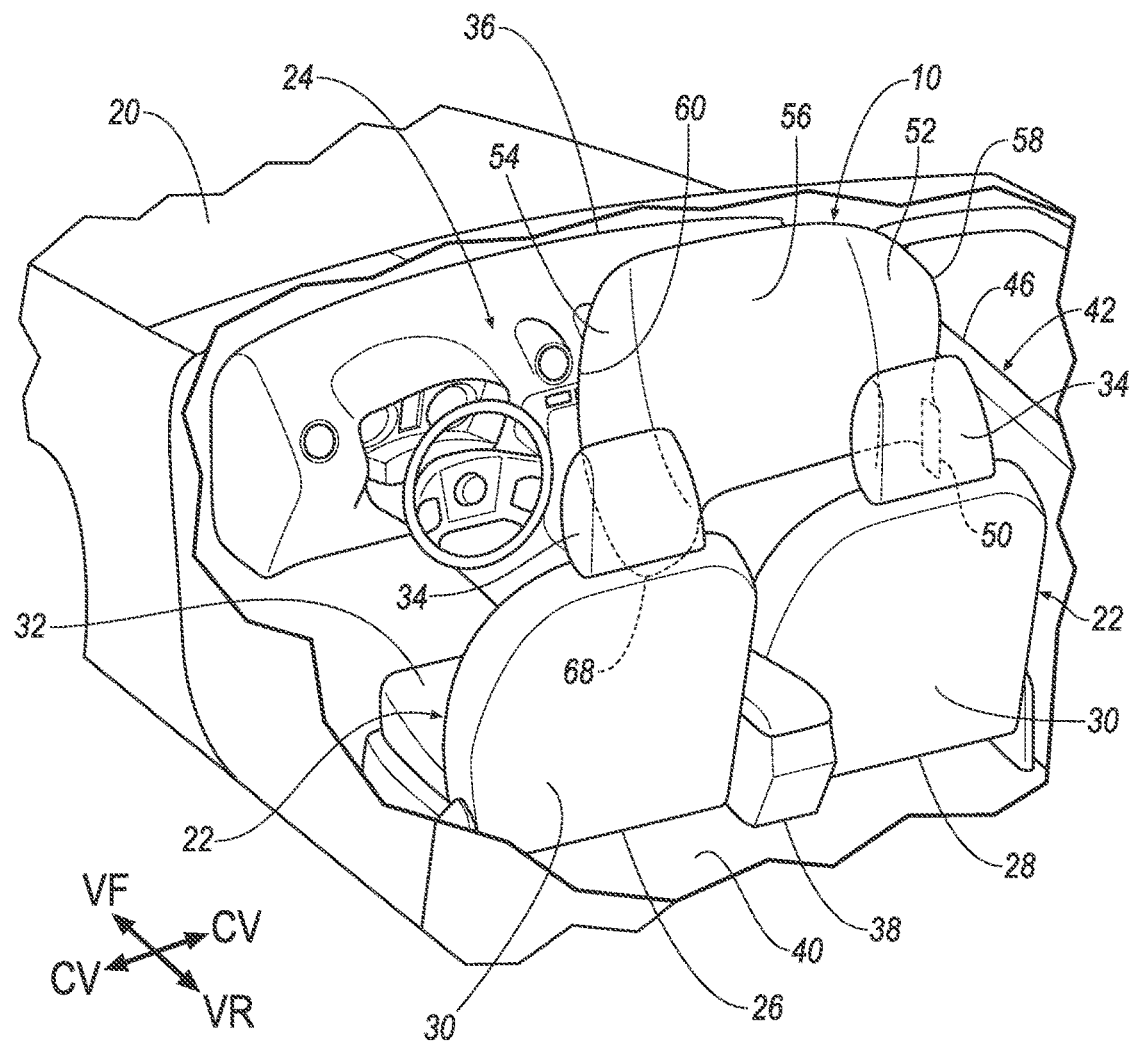
FIG. 3 is the perspective view of FIG. 2 with the airbag inflated in a second stage of inflation toward the seat in a vehicle-rearward direction to an inflated position.
Figure 4A:
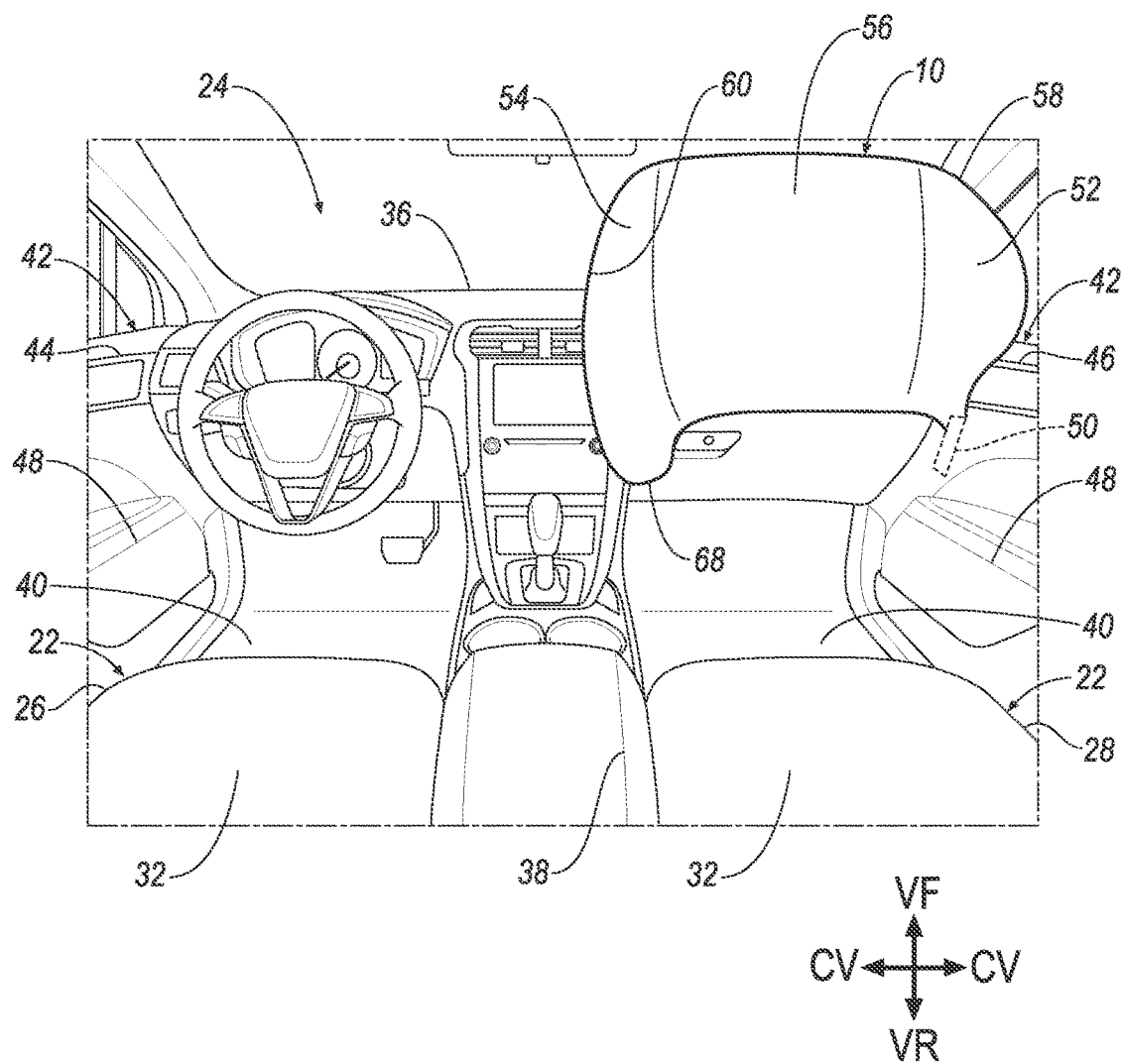
FIG. 4A is a rear view of the airbag including a concave portion, a first end, and a second end.
Figure 4B:
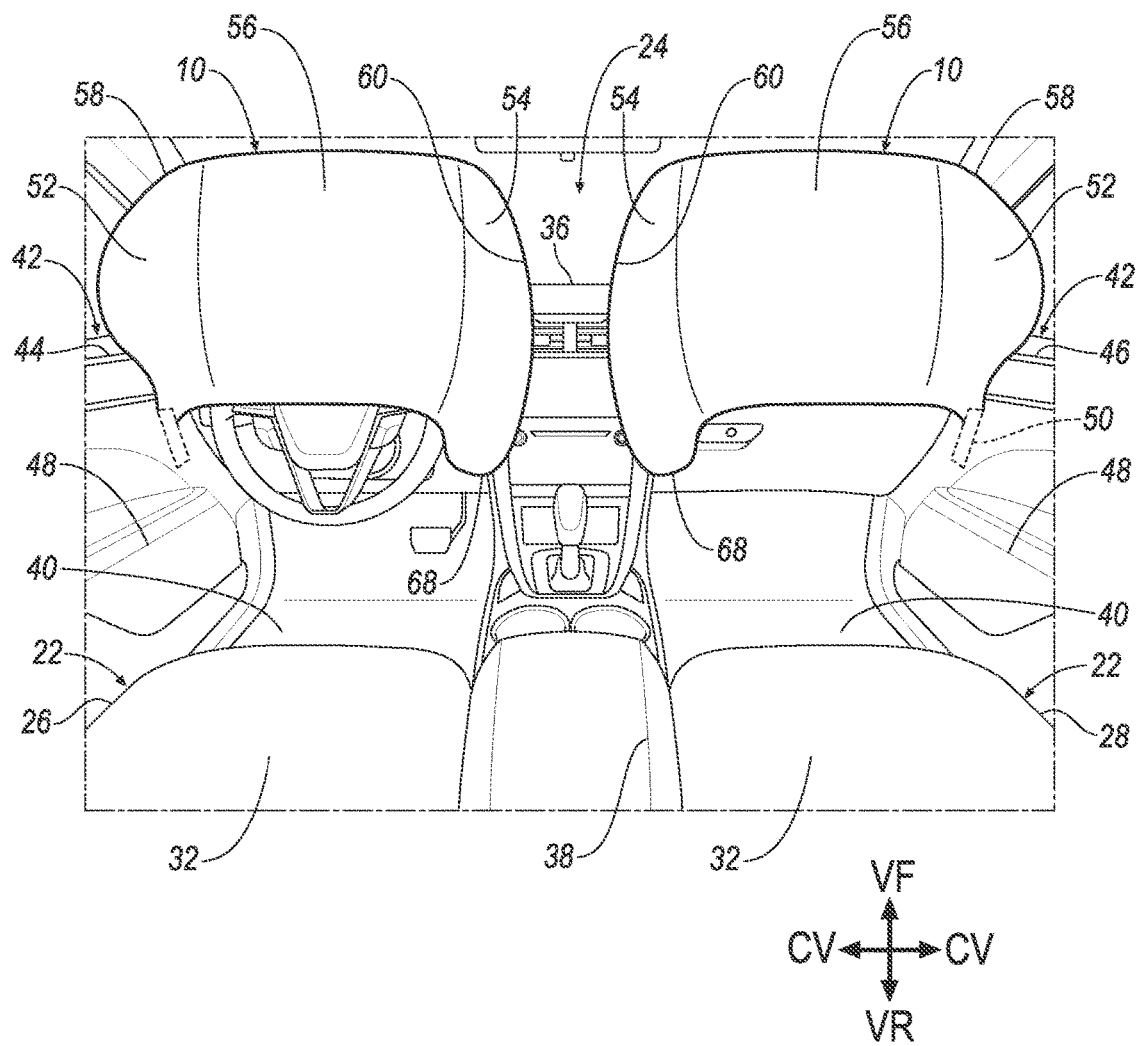
FIG. 4B is the rear view of FIG. 4A with the airbag inflated from a driver door when a steering wheel is stowed in an instrument panel during autonomous operation of the vehicle, and a second airbag inflated from a passenger door.
Figure 5:
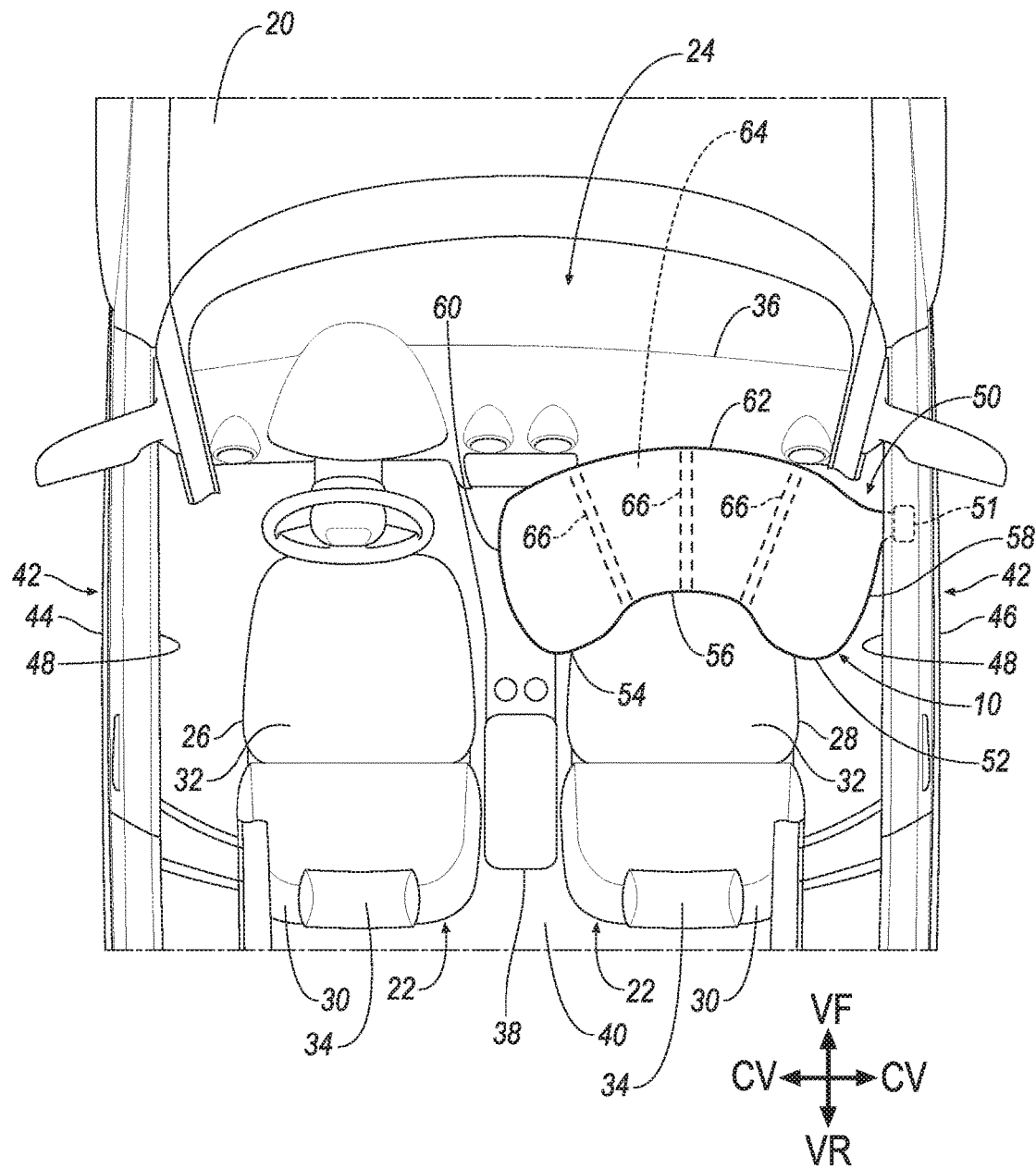
FIG. 5 is a top view of a tether disposed in an inflation chamber of the airbag in the inflated position.

When an impact to a vehicle 20 is sensed, e.g. frontal impact, the airbag 10 is inflated from an uninflated position, as shown in FIG. 1, to an inflated position, as shown in FIGS. 3-5. The airbag 10 deploys from the uninflated position to the inflated position in two stages of inflation. In a first stage of inflation, the airbag expands from a door 42 in a cross-vehicle direction CV, as shown in FIG. 2. In the first stage of inflation, the fastener 18 is fixed to the folds 12, i.e. apex 14 and/or limbs 16 to reduce expansion of the airbag 10 in a vehicle-rearward direction VR during the first stage of inflation. As the airbag 10 is further inflated to a second stage of inflation, as shown in FIGS. 3-5, pressure inside the airbag 10 ruptures the fastener 18 to release the folds 12 from each other and expand the airbag 10 in the vehicle-rearward direction VR.

With reference to FIGS. 1-3, the vehicle 20 includes a seat 22. The seat 22 may be disposed at a front of a passenger cabin 24 of the vehicle 20, e.g. a driver seat 26 and a passenger seat 28. The position and orientation of the seats 22 and components thereof may be adjustable by an occupant. The seat 22 may include a seat back 30, a seat bottom 32, and a headrest 34. The headrest 34 may be supported by the seat back 30 and may be stationary or movable relative to the seat back 30. The seat back 30 may be supported by the seat bottom 32 and may be stationary or movable relative to the seat bottom 32. The vehicle 20 may include any suitable number of seats 22 in any suitable arrangement.

With continued reference to FIGS. 1-3, the vehicle 20 includes an instrument panel 36. The instrument panel 36 may be disposed at a vehicle-forward end of the passenger cabin 24 and may include vehicle controls. Specifically, the instrument panel 36 may be disposed in a vehicle-forward direction VF relative to the seat 22 and extend in the cross-vehicle direction CV, as identified in FIGS. 1-5. The instrument panel 36 may act as a reaction surface that prevents inflation of the airbag 10 in the vehicle-forward direction VF and supports the airbag 10 when an occupant impacts the airbag 10 during movement in the vehicle-forward direction VF. A steering wheel may be mounted to the instrument panel 36 in the passenger cabin 24. The steering wheel may be moveable to a stowed position, e.g., retracted in the instrument panel 36, during autonomous operation of the vehicle 20.

With continued reference to FIGS. 1-3, the vehicle 20 may include a center console 38. The center console 38 may, for example, be secured to a floor 40 of the vehicle 20 between the driver seat 26 and the passenger seat 28. The center console 38 may be in the vehicle-rearward direction VR relative to the instrument panel 36. The center console 38 may, for example, include a storage bin, a cup holder, a front tray, and an armrest.

The vehicle 20 includes doors 42 that provide access to the passenger cabin 24, e.g., a front driver door 44, a front passenger door 46, etc. Each door 42 may include an inner panel (not numbered) joined to an outer panel (not numbered), and a trim panel 48 mounted to the inner panel. The trim panel 48 may be mounted to the inner panel by any suitable means, e.g. adhesive, clips, pins, etc. The inner panel and the trim panel 48 may be adjacent to the instrument panel 36 within in the passenger cabin 24. The inner and the outer panels may, for example, be constructed of metal such as steel, aluminum, etc. The trim panel 48 may be made of any suitable material such as plastic, vinyl, leather, etc.

The vehicle 20 includes an airbag assembly 50 that includes a housing 51 (FIG. 5), an inflator 72, and the airbag 10. The airbag assembly 50 may, for example, be mounted to the door 42, i.e., the inner panel. Specifically, the trim panel 48 and inner door may define a space (not shown) therebetween, and the airbag assembly 50 may be mounted to the inner panel in the space between the inner panel and the trim panel 48. The housing 51 may be of any suitable material, e.g., a rigid polymer, a metal, a composite, or a combination of rigid materials. The housing 51 may be configured to house the airbag 10 in the uninflated position and support the airbag 10 in the inflated position.

As shown in FIG. 4A, the airbag 10 may be mounted to the front passenger door 46. In the alternative, or in addition, another airbag 10 may be mounted to the front driver door 44, as shown in FIG. 4B. In such an example, the airbags 10 may be identical, or nearly identical, and may be mirror images of each other. When an impact is sensed, e.g. frontal impact, the airbags 10 inflate away from the doors 42 in the cross-vehicle direction CV. In other words, the airbags 10 inflate toward the center console 38 between the seat 22 and the instrument panel 36. When the airbag 10 is mounted to the front driver door 44, the airbag 10 may be deployed only when the steering wheel is in the stowed position.

The airbag 10 may be formed of any suitable type of material, e.g., from a woven polymer. For example, the airbag 10 may be formed of woven nylon yarn, e.g., nylon 66. Other suitable examples include polyetheretherketone (PEEK), polyetherketoneketone (PEKK), polyester, or any other suitable polymer. The woven polymer may include a coating, such as, for example, silicone, neoprene, urethane, etc. For example, the coating may be polyorganosiloxane.

With continued reference to FIGS. 4A and 4B, in the inflated position, the airbag 10 may include a first end 52 adjacent the door 42, a second end 54 spaced from the first end 52, and a concave portion 56 between the first end 52 and second end 54. Specifically, the airbag 10 includes a first outer protrusion 58 at the first end 52 and a second outer protrusion 60 at the second end 54. The first outer protrusion 58 is between the concave portion 56 and the first end 52, and the second outer protrusion 60 is between the concave portion 56 and the second end 54. The adjectives "first" and "second" are used in this paragraph as identifiers and are not intended to signify importance or order.

The airbag 10 may include a back portion 62 spaced from the concave portion 56. The back portion 62 is disposed between the concave portion 56 and the instrument panel 36, and the back portion 62 and the concave portion 56 are spaced from each other on opposite sides of an inflation chamber 64 of the airbag 10. As set forth further below, the inflation chamber 64 of the airbag 10 (identified in FIGS. 7A-C) extends along the concave portion 56, the first outer protrusion 58, and the second outer protrusion 60.

The concave portion 56 is spaced from the seat 22 farther than the first end 52 and the second end 54 are spaced from the seat 22, as shown in FIG. 5. Specifically, the concave portion 56 is spaced from the seat 22 farther than both the first outer protrusion 58 and the second outer protrusion 60 are spaced from the seat 22.

The concave portion 56 faces the seat 22 in the vehicle-rearward direction VR. The concave portion 56 is concave, i.e., curves inward toward the vehicle-forward direction VF relative to the first end 52 and the second end 54. Specifically, the concave portion 56 extends concavely from the first outer protrusion 58 to the second outer protrusion 60.

The airbag 10 may include a tether 66 disposed in the inflation chamber 64 and fixed to the concave portion 56 to retain the concave shape of the concave portion 56 as the airbag 10 is inflated to the inflated position. The tether 66 may extend from the concave portion 56 to the back portion 62. As shown in FIG. 5, the tether 66 allows the concave portion 56 to be spaced from the seat 22 farther than the first end 52 and the second end 54 are spaced from the seat 22. In other words, the tether 66 may restrain extension of the concave portion 56 towards the seat 22 when the airbag 10 is in the inflated position. In the uninflated position, the tether 66 may be folded within the inflation chamber 64. The tether 66 may be formed of any suitable material and, for example, may be formed of the same type of material as the rest of the airbag 10.

The first end 52 is attached to the door 42, i.e., through the inflator 72, in both the uninflated and inflated positions. The second end 54 extends away from the door 42 toward the center console 38 in the inflated position.

The airbag 10 may include an extension 68 extending along the second end 54 adjacent the center console 38. Specifically, the second outer protrusion 60 includes the extension 68, and the extension 68 protrudes from the concave portion 56 in a cantilevered fashion. The extension 68 is disposed in a vehicle-inboard position relative to the concave portion 56 and extends downwardly relative to the concave portion 56. When the airbag 10 is inflated, the extension 68 is disposed between a leg of the occupant and the center console 38 to reduce or prevent impact between the leg and the center console 38 during a vehicle impact.

When the airbag 10 is in the inflated position, the inflation chamber 64 extends between the concave portion 56 and the back portion 62. The inflation chamber 64 also extends into the first outer protrusion 58 and the second outer protrusion 60, including the extension 68. The inflation chamber 64 may be inflated with an inflation medium, as set forth further below, to inflate the airbag 10 from the uninflated position to the inflated position.

Figure 6:
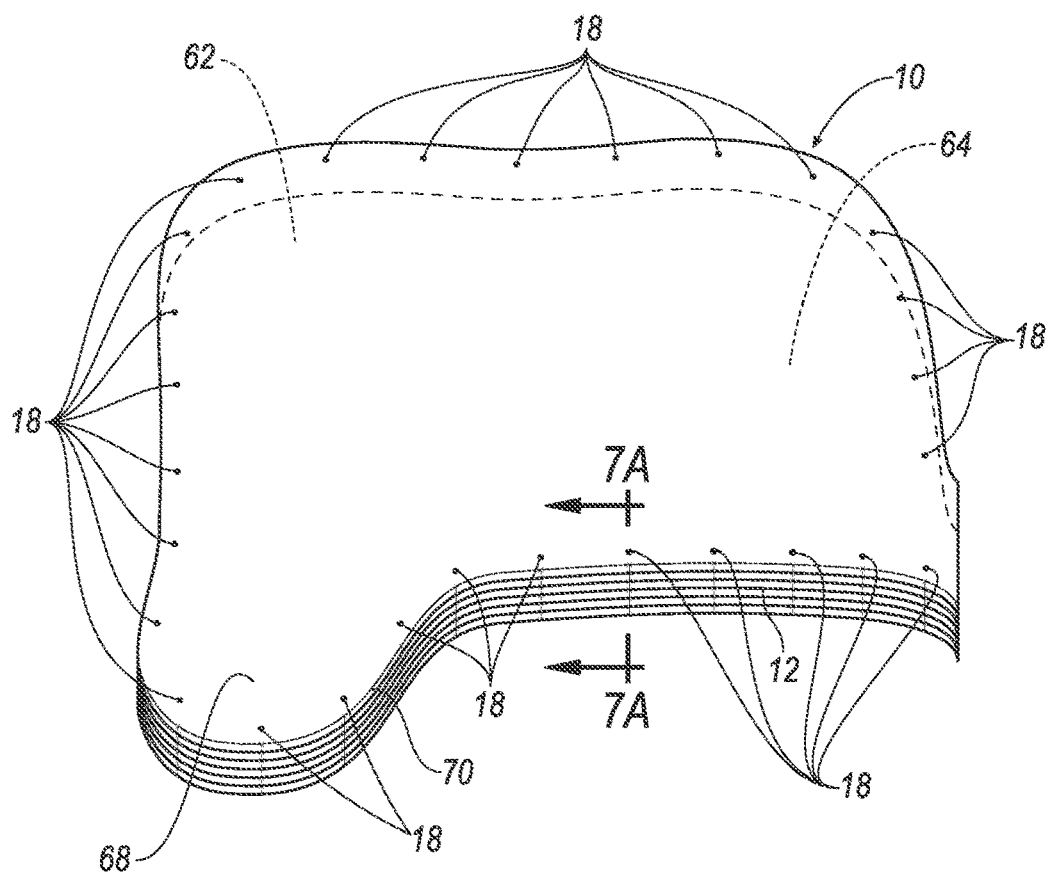
FIG. 6 is a perspective view of the airbag including folds along a periphery of the airbag and fasteners fixed to the folds.

As shown in FIG. 6, the folds 12 may extend around a periphery 70 of the airbag 10 along the concave portion 56, the back portion 62, the first outer protrusion 58, and the second outer protrusion 60. The folds 12 may extend continuously around the periphery 70, i.e., encircling the rest of the airbag 10.

Figure 7A:
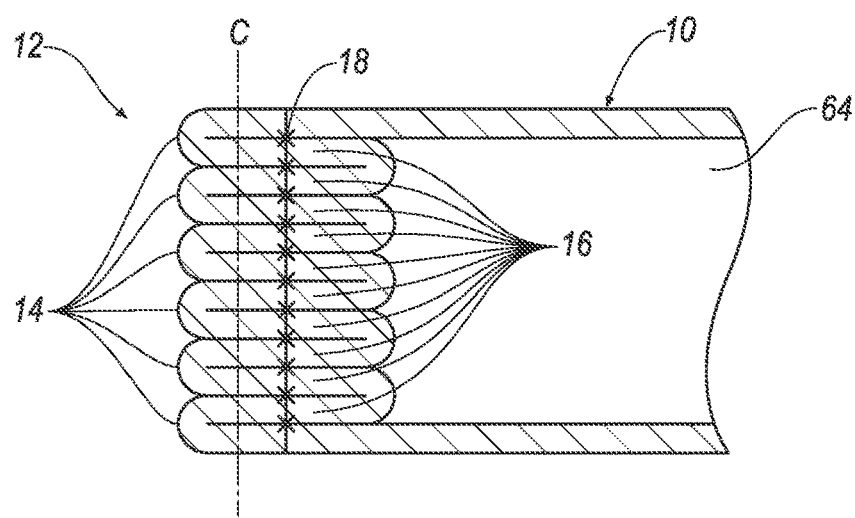
FIG. 7A is a cross-sectional view of the folds with the fastener fixed to the folds.
Figure 7B:
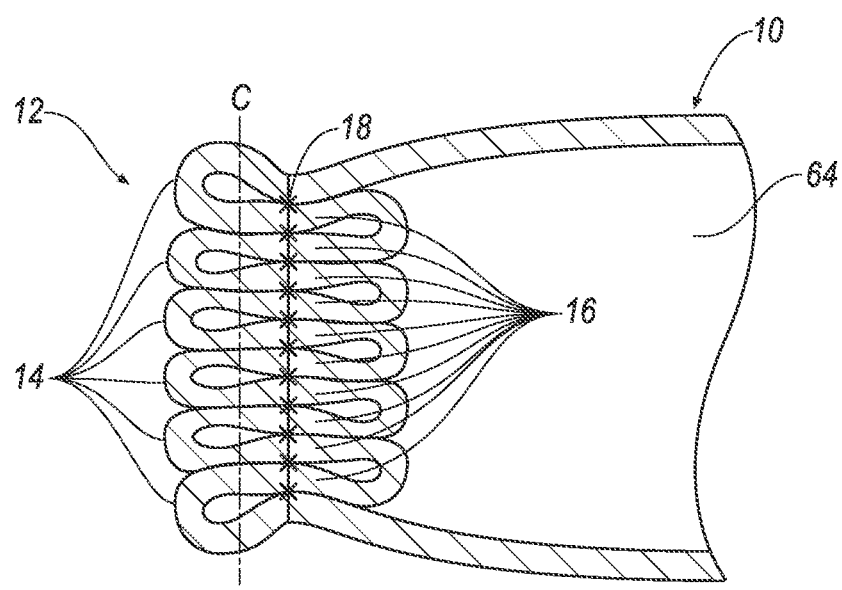
FIG. 7B is the cross-sectional view of the folds with a first inflation pressure inflating the folds.
Figure 7C:
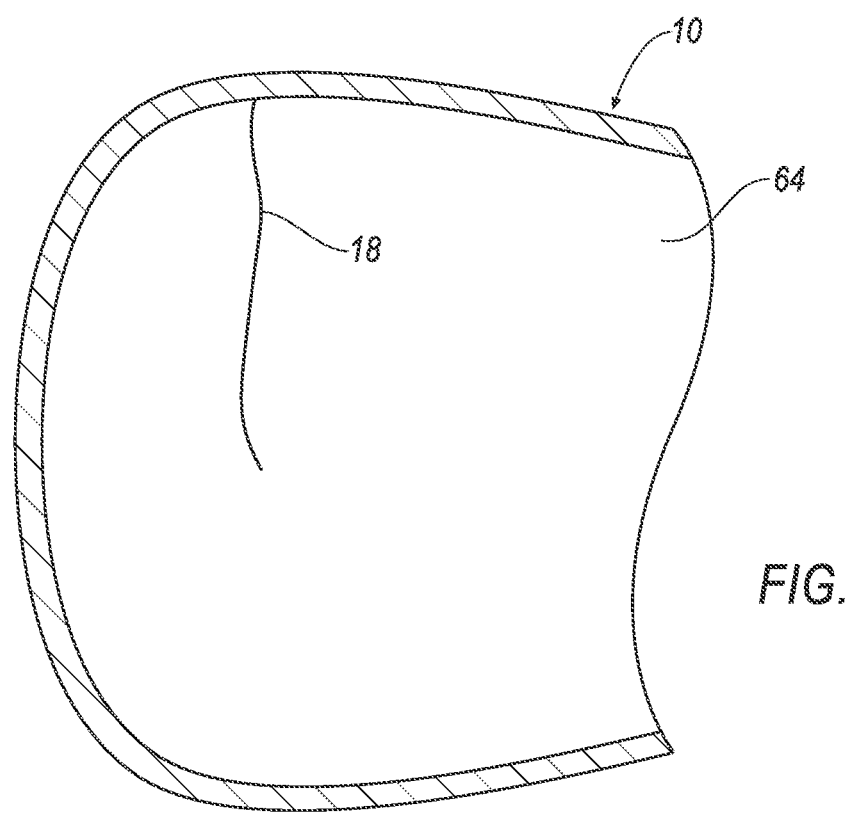
FIG. 7C is the cross-sectional view of the folds with a second inflation pressure inflating the folds and breaking the fasteners.

The folds 12 are folded when the airbag 10 is in the uninflated position, as shown in FIGS. 7A and 7B, and unfold as the airbag 10 is inflated to the inflated position, as shown in FIG. 7C. As set forth above, each limb 16 extends from the apex 14 to one of the limbs 16 of an adjacent one of the folds 12. The apexes 14 of the folds 12 may, for example, be aligned along a common axis C, as identified in FIG. 7C. In the first stage of inflation, as shown in FIG. 2, the common axis C may extend in the vehicle-rearward direction VR. The folds 12 may have any suitable shape, e.g., accordion shape.

As set forth above, the fasteners 18 are fixed to the folds 12. The fasteners 18 may, for example, extend through each of the limbs 16 of the folds 12, i.e., through the limbs 16 and the inflation chamber 64. The fasteners 18 may be one or more stitches sewn through the limbs 16. The fasteners 18 may be a thread such as a fabric thread, e.g., nylon, polyester, etc. The stitch may extend through each of the limbs 16. As another example, the fasteners 18 may include a plurality of stitches each connected to two limbs 16. Alternatively, or in addition, the fasteners 18 may be an adhesive that fixes the folds 12 to each other. The adhesive may, for example, be epoxy adhesive, acrylic adhesive, etc. With reference to FIG. 6, the airbag 10 may include a plurality of fasteners 18 spaced from each other along the periphery 70 of the airbag 10.

As set forth above, each fastener 18 releasably connects the folds 12 to each other. Each fastener 18 is frangible relative to the folds 12. Specifically, the fasteners 18 are configured, e.g., sized, shaped, positioned, to rupture when the airbag 10 is inflated to a threshold pressure. As the airbag 10 is inflated but prior to inflation to the threshold pressure, the airbag 10 is in the first stage of inflation, as shown in FIG. 2. In the first stage of inflation, the airbag 10 expands in the cross-vehicle direction CV. When the pressure in the inflation chamber 64 reaches the threshold pressure, the fasteners 18 rupture and the second stage of inflation is initiated, during which time the airbag 10 expands to the inflated position, as shown in FIG. 3.

The inflator 72 may be, for example, a pyrotechnic inflator that uses a chemical reaction to drive inflation medium to the airbag 10. The inflator 72 may be of any suitable type, e.g., a cold-gas inflator, hybrid inflator, etc. Upon receiving a signal from, e.g., a controller 74, the inflator 72 may inflate the airbag 10 with the inflation medium, such as a gas.

The inflator 72 may be a single-stage inflator. In that instance, the inflator 72 releases a single deployment of inflation medium to the airbag 10. At the beginning of this single deployment of inflation medium, the airbag 10 initially expands to the first stage of inflation, as shown in FIG. 2. As the pressure continues to build during this single deployment, the pressure in the inflation chamber 64 increases above the threshold pressure, i.e., a second inflation pressure, which ruptures the fasteners 18 and expands the airbag 10 in the second stage of inflation to the inflated position, as shown in FIG. 3.

As another example, the inflator 72 may be a dual-stage inflator. In that instance, the inflator 72 releases a first deployment and a subsequent second deployment of inflation medium. The first deployment expands the airbag 10 to the first stage of inflation and inflates the inflation chamber 64 to a pressure below the threshold pressure. The second deployment inflates the inflation chamber 64 to a pressure exceeding the threshold pressure, which ruptures the fasteners 18 and expands the airbag 10 in the second stage of inflation to the inflated position, as shown in FIG. 3.

The airbag 10 may be in direct fluid communication with the inflator 72. As another example, the airbag assembly 50 may include a fill tube (not shown) connecting the inflator 72 to the airbag 10.

Figure 8:
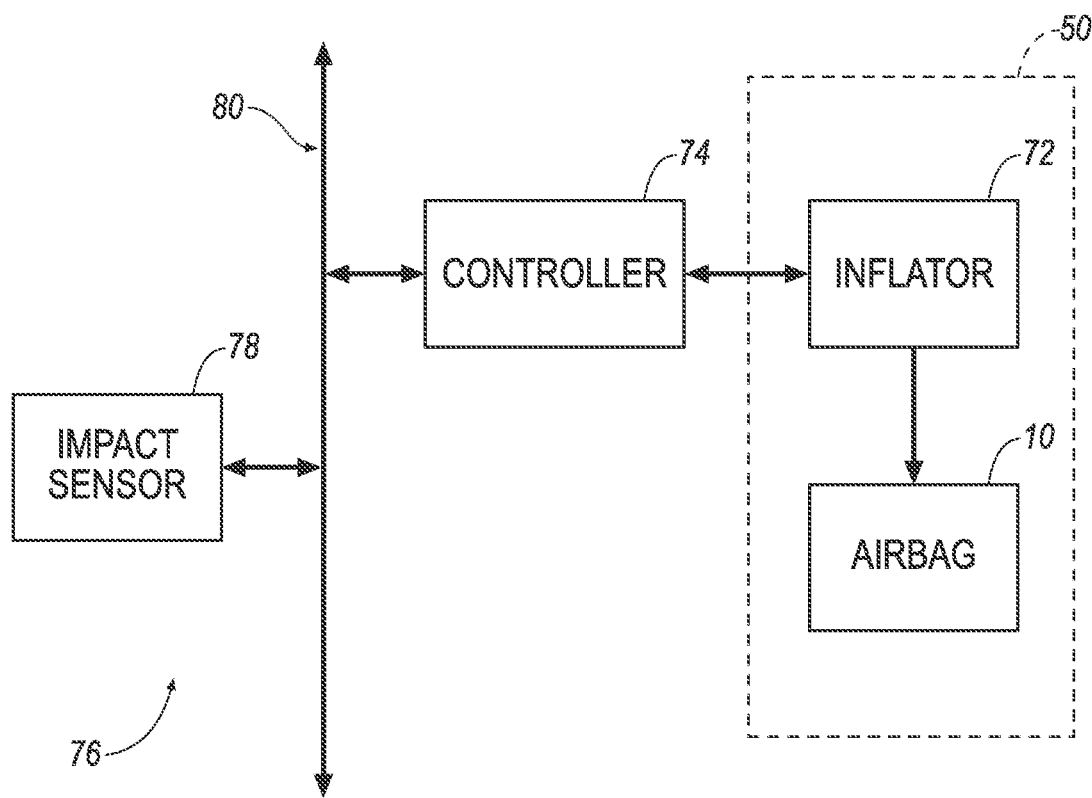
FIG. 8 is a block diagram of a control system.

With reference to FIG. 8, the vehicle 20 may include a control system 76 having the controller 74 in communication with the inflator 72 and/or an impact sensor 78. The controller 74, the inflator 72, and the impact sensor 78 may communicate through a communications network 80.

The controller 74 may be a microprocessor-based controller. The controller 74 may include a processor, memory, etc. The memory of the controller 74 may store instructions executable by the controller 74.

The impact sensor 78 may be in communication with the controller 74. The impact sensor 78 is adapted to detect an impact, e.g., frontal impact, to the vehicle 20. The impact sensor 78 may be of any suitable type, for example, post-contact sensors such as accelerometers, pressure sensors, contact switches; and pre-impact sensors such as radar, LIDAR, and vision-sensing systems. The vision-sensing system may include one or more cameras, CCD image sensors, CMOS image sensors, etc. The impact sensor 78 may be located at numerous points in or on the vehicle 20.

The control system 76 may transmit signals through the communications network 80 (such as a controller area network (CAN) bus), Ethernet, and/or by any other wired or wireless communication network.

In response to a sensed impact with another object, the impact sensor 78 may transmit an instruction through the communications network 80 to the controller 74. The controller 74 may be programmed to instruct the airbag assembly 50, i.e., inflator 72, to inflate the airbag 10. When the airbag 10 is mounted to the front driver door 44, the controller 74 may be programmed to deploy the airbag 10 only when the steering wheel is in the stowed position. In other words, the controller 74 may be programmed to inflate the airbag 10 mounted to the front driver door 44 in response to a sensed impact and in response to a signal indicating that the steering wheel is in the stowed position.

During the first stage of inflation, the airbag 10 expands in the cross-vehicle direction CV. As pressure builds in the inflation chamber 64 and exceeds the threshold pressure, i.e., the second inflation pressure, the fasteners 18 rupture and the airbag 10 expands in the vehicle-rearward direction VR to the inflated position. In the inflated position, the concave portion 56 may receive a head and upper chest of the occupant if the occupant is urged in the vehicle-forward direction VF. The concave portion 56 catches the head, and the first outer protrusion 58 and the second outer protrusion 60 retain the head of the occupant in the concave portion 56 to reduce the likelihood that the head of the occupant contacts the door 42, center console 38, instrument panel 36, etc. The airbag 10 may absorb energy from the occupant moving, at least in part, in the vehicle-forward direction VF and the cross-vehicle direction CV during an impact, i.e., forwardly and toward the impacted corner of the vehicle 20.

Figure 9:
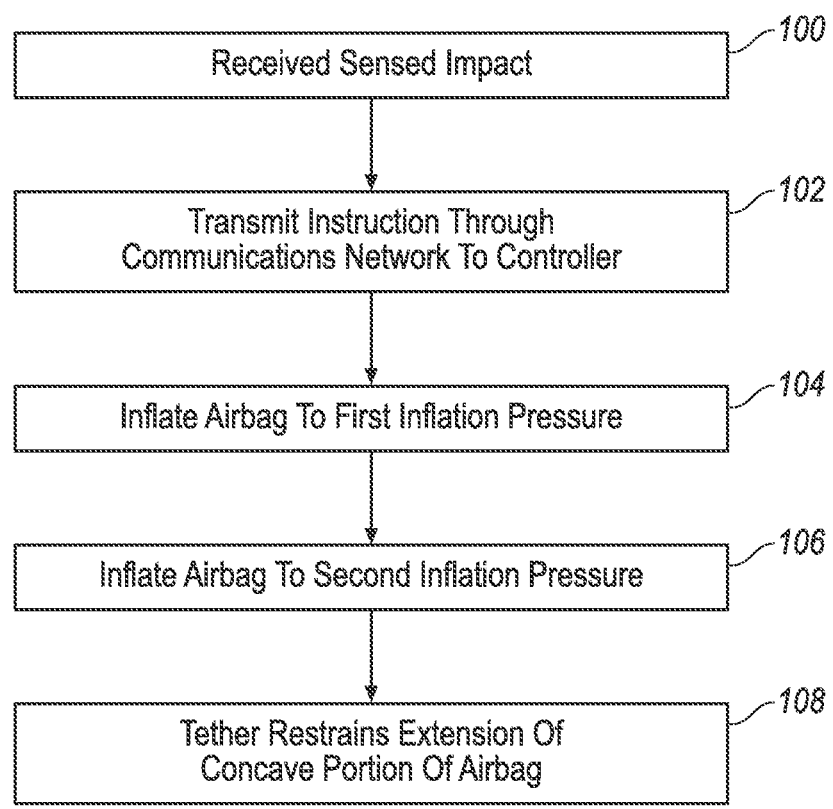
FIG. 9 is a block diagram of a process for inflating the airbag.

FIG. 9 illustrates a method of inflating the airbag 10. The process begins in block 100, in which an impact, e.g., frontal impact, of the vehicle 20 with another object is sensed.

In block 102, the impact sensor 78 may transmit an instruction through the communications network 80 to the controller 74. The controller 74 may be programmed to instruct the airbag assembly 50, i.e., inflator 72, to inflate the airbag 10.

In block 104, the airbag 10 is inflated to a pressure below the threshold pressure to expand the airbag 10 away from the door 42 in the cross-vehicle direction CV in the first stage of inflation.

In block 106, the pressure in the inflation chamber 64 is increased above the threshold pressure. When the pressure in the inflation chamber 64 exceeds the threshold pressure, the second inflation pressure breaks the fasteners 18 and expands the airbag 10 in a vehicle-rearward direction VR.

As set forth above, the second inflation pressure allows the concave portion 56 to be spaced from the seat 22 farther than the first end 52 and the second end 54 are spaced from the seat 22. Specifically, in block 108, the tether 66 restrains extension of the airbag 10 to form the concave portion 56 facing the vehicle-rearward direction VR. In the inflated position, the tether 66 is taut between the concave portion 56 and the back portion 62 to form the concave portion 56 facing the seat 22.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly, comprising:
   an airbag including folds, each fold having an apex and limbs, the limbs of at least one of the folds extending from the apex to limbs of adjacent folds; and
   a fastener fixed to the folds and releasably connecting the folds to each other, the fastener being configured to rupture when the airbag is inflated to a threshold pressure;
   the airbag being initially expandable in a cross-vehicle direction in a first stage of inflation to a pressure below the threshold pressure, the fastener and the folds in the first stage of inflation moving in the cross-vehicle direction to an inflated position with the fastener fixed to the folds and the folds stacked in a vehicle-rearward direction, and the airbag being subsequently expandable in a vehicle-rearward direction with the fastener ruptured during inflation to a pressure above the threshold pressure, the vehicle-rearward direction being transverse to the cross-vehicle direction; and
   the airbag having a periphery and the folds extend continuously around the periphery encircling a vehicle-rearward panel that extends to the folds along the entire periphery in the first stage of inflation.

2. The airbag assembly as set forth in claim 1, wherein the fastener is frangible relative to the folds.

3. The airbag assembly as set forth in claim 1, wherein the fastener is a stitch.

4. The airbag assembly as set forth in claim 1, wherein the fastener extends through the limbs of the folds.

5. The airbag assembly as set forth in claim 1, wherein the airbag includes an inflation chamber, the fastener extending through the limbs and the inflation chamber.

6. The airbag assembly as set forth in claim 1, wherein the fastener is further defined as a plurality of fasteners spaced from each other along the periphery of the airbag.

7. The airbag assembly as set forth in claim 1, further comprising a housing, the airbag being supported by and inflatable from the housing, the airbag elongated from the housing in a cross-vehicle direction when inflated.

8. An assembly, comprising:
   a door;
   a seat;
   an airbag mounted to the door and being inflatable to an inflated position;
   wherein in the inflated position the airbag has a first end adjacent the door, a second end spaced from the first end, and a concave portion between the first and second ends, the concave portion being spaced from the seat farther than the first and second ends are spaced from the seat;
   the airbag including folds, each fold having an apex and limbs, the limbs of at least one of the folds extending from the apex to limbs of adjacent folds; and
   a fastener fixed to the folds and releasably connecting the folds to each other, the fastener being configured to rupture when the airbag is inflated to a threshold pressure;
   the airbag being initially expandable in a cross-vehicle direction in a first stage of inflation to a pressure below the threshold pressure, the fastener and the folds in the first stage of inflation moving in the cross-vehicle direction to an inflated position with the fastener fixed to the folds and the folds stacked in a vehicle-rearward direction, and the airbag being subsequently expandable in a vehicle-rearward direction with the fastener ruptured during inflation to a pressure above the threshold pressure, the vehicle-rearward direction being transverse to the cross-vehicle direction; and
   the airbag having a periphery and the folds extend continuously around the periphery encircling a vehicle-rearward panel that extends to the folds along the entire periphery in the first stage of inflation.

9. The assembly as set forth in claim 8, further comprising an instrument panel, the airbag extending from the door across the seat between the seat and the instrument panel in the inflated position.

10. The assembly as set forth in claim 8, wherein the concave portion faces the seat.

11. The assembly as set forth in claim 8, further comprising a center console, the airbag including an extension extending along the second end adjacent the center console.

12. The assembly as set forth in claim 8, wherein the airbag includes an inflation chamber, further comprising a tether disposed in the inflation chamber and fixed to the concave portion.

13. The assembly as set forth in claim 12, wherein the airbag includes a back portion spaced from the concave portion by the inflation chamber, the tether extending from the concave portion to the back portion.

14. The assembly as set forth in claim 8, further comprising an inflator in fluid communication with the airbag.

15. A method of inflating an airbag mounted to a door, the airbag having a periphery, folds around the periphery, and a fastener connecting the folds, each fold having an apex and limbs, the limbs of at least one of the folds extending from the apex to limbs of adjacent folds, and the fastener fixed to the folds and releasably connecting the folds to each other, the fastener being configured to rupture when the airbag is inflated to a threshold pressure, the airbag being initially expandable in a cross-vehicle direction in a first stage of inflation to a pressure below the threshold pressure, the fastener and the folds in the first stage of inflation moving in the cross-vehicle direction to an inflated position with the fastener fixed to the folds and the folds stacked in a vehicle-rearward direction during inflation to a pressure below the threshold pressure, and the airbag being subsequently expandable in a vehicle-rearward direction with the fastener ruptured during inflation to a pressure above the threshold pressure, the vehicle-rearward direction being transverse to the cross-vehicle direction, and the airbag having a periphery and the folds extend continuously around the periphery encircling a vehicle-rearward panel that extends to the folds along the entire periphery in the first stage of inflation, the method comprising:
   inflating the airbag to a first inflation pressure below the threshold pressure to expand the airbag away from the door in the cross-vehicle direction;
   inflating the airbag to a second inflation pressure greater than the threshold pressure to break the fastener and expand the airbag in the vehicle-rearward direction.

16. The method as set forth in claim 15, further comprising restraining extension of the airbag with a tether to form a concave portion facing the vehicle-rearward direction.

* * * * *